US00RE37910E

(19) United States
(12) Reissued Patent
Nowakowski

(10) Patent Number: US RE37,910 E
(45) Date of Reissued Patent: Nov. 26, 2002

(54) THREE DIMENSIONAL INSERT CONSTRUCTION

(75) Inventor: Anthony J. Nowakowski, Crystal Lake, IL (US)

(73) Assignee: C. Joyce Witt, Libertyville, IL (US)

(21) Appl. No.: 09/659,374

(22) Filed: Sep. 8, 2000

Related U.S. Patent Documents

Reissue of:
(64) Patent No.: 5,803,261
Issued: Sep. 8, 1998
Appl. No.: 08/876,611
Filed: Jun. 16, 1997

U.S. Applications:
(63) Continuation-in-part of application No. 08/742,785, filed on Oct. 31, 1996, now abandoned.

(51) Int. Cl.[7] ..... B65D 73/00
(52) U.S. Cl. ..... 206/466; 206/478; 206/778
(58) Field of Search ..... 206/320, 460, 206/461, 466, 497, 495, 484, 530, 539, 583, 576, 594, 713, 717, 718, 776–778, 813, 820, 831, 478

(56) References Cited

U.S. PATENT DOCUMENTS

| | | | | |
|---|---|---|---|---|
| 2,147,384 A | | 2/1939 | Salfisberg | |
| 2,465,172 A | | 3/1949 | Salfisberg | |
| 2,513,093 A | | 6/1950 | Hageman | |
| 2,618,336 A | | 11/1952 | Davidson | |
| 2,655,842 A | | 10/1953 | Baumgartner | |
| 3,127,027 A | | 3/1964 | Roser et al. | |
| 3,220,158 A | | 11/1965 | Roser et al. | |
| 3,272,044 A | | 9/1966 | Obenshain | |
| 3,281,143 A | | 10/1966 | Mommsen et al. | |
| 3,286,831 A | | 11/1966 | Giberstein | |
| 3,302,946 A | | 2/1967 | Anderson | |
| 3,332,324 A | | 7/1967 | Lehmacher et al. | |
| 3,390,875 A | | 7/1968 | Beert et al. | |
| 3,394,802 A | | 7/1968 | Hershaft | |
| 3,481,520 A | | 12/1969 | Pickering | |
| 3,526,315 A | | 9/1970 | Killian | |
| 3,540,579 A | * | 11/1970 | Hellstrom | 206/539 |
| 3,575,290 A | | 4/1971 | Stork | |
| 3,631,651 A | | 1/1972 | Kopp | |
| 3,716,133 A | * | 2/1973 | Koebler et al. | 206/497 |
| 3,717,244 A | | 2/1973 | Smith | |
| 3,730,411 A | | 5/1973 | Brockmuller | |
| 3,748,937 A | | 7/1973 | Long | |
| 3,764,002 A | | 10/1973 | Spiegel et al. | |
| 3,784,004 A | | 1/1974 | Meyer | |
| 3,797,822 A | | 3/1974 | Anderson | |
| 3,856,196 A | | 12/1974 | Bayne et al. | |
| 3,881,645 A | | 5/1975 | Kopp | |
| 3,908,983 A | | 9/1975 | Long | |
| 3,929,326 A | | 12/1975 | Serangoli | |
| 3,991,924 A | | 11/1976 | Schueler | |
| 4,039,074 A | | 8/1977 | Laughton | |
| 4,039,181 A | | 8/1977 | Prewer | |

(List continued on next page.)

FOREIGN PATENT DOCUMENTS

| | | |
|---|---|---|
| DE | 27-30-133 | 1/1979 |
| GB | 545113 | 5/1942 |
| JP | 53-31067 | 8/1978 |
| JP | 53-38997 | 10/1978 |
| WO | WO83/04013 | 11/1983 |

*Primary Examiner*—Luan K. Bui
(74) *Attorney, Agent, or Firm*—Roper & Quigg

(57) ABSTRACT

A three-dimensional insert for use in a handling system comprising a sheet of cardstock or the like defined by ends and first and second sides, a laminate applied to the top surface of the cardstock, and an overwrap material bonded to the laminate proximate to the first and second sides. This structure enables a three-dimensional object to be placed within the overwrap material without risk of movement to the peripheral sides.

60 Claims, 1 Drawing Sheet

U.S. PATENT DOCUMENTS 4,060,168 A 11/1977 Romagnoli
4,069,957 A 1/1978 Moffitt
4,091,978 A 5/1978 Graham, II
4,118,022 A 10/1978 Rayfield et al.
4,179,113 A 12/1979 Gallimore
4,182,222 A 1/1980 Stahl
4,216,952 A 8/1980 McInerny
4,217,744 A 8/1980 Mizutani
4,222,511 A 9/1980 Schueler
4,261,497 A 4/1981 Roetter et al.
4,284,221 A 8/1981 Nagel et al.
4,323,230 A 4/1982 Rising
4,345,753 A 8/1982 Marshall
4,351,517 A 9/1982 Neal et al.
4,354,894 A 10/1982 Lewis et al.
4,375,189 A 3/1983 Berner et al.
4,385,537 A 5/1983 Wolf
4,411,364 A * 10/1983 Friedman ..... 206/497
4,412,631 A 11/1983 Haker
4,429,217 A 1/1984 Hill et al.
4,455,809 A 6/1984 Dallaserra
4,498,894 A 2/1985 Kuckhermann
4,516,765 A 5/1985 Stocco et al.
4,524,557 A 6/1985 Silverman et al.
4,530,200 A 7/1985 Prewer
4,577,789 A 3/1986 Hofmann et al.
4,651,983 A 3/1987 Long
4,657,133 A 4/1987 Komatsu et al.
4,658,564 A 4/1987 Bell, Jr. et al.
4,667,814 A 5/1987 Wakamatsu et al.
4,668,212 A 5/1987 Kotani
4,688,708 A 8/1987 Irvine et al.
4,696,145 A 9/1987 Schmidt et al.
4,717,043 A 1/1988 Groover et al.
4,737,364 A 4/1988 Kaldgris
4,752,002 A 6/1988 Takahashi et al.
4,781,297 A 11/1988 Abrahamsson et al.
4,851,075 A 7/1989 Parker
4,856,649 A 8/1989 Inoue
4,856,650 A 8/1989 Inoue
4,867,304 A 9/1989 Garcia
4,897,273 A 1/1990 Kotaki et al.
4,929,226 A 5/1990 Focke et al.
4,982,337 A 1/1991 Burr et al.
5,010,240 A 4/1991 Sheldon
5,079,901 A 1/1992 Kotsiopoulos
5,090,591 A 2/1992 Long
5,091,261 A 2/1992 Casey
5,129,527 A * 7/1992 Lataix ..... 206/539
5,141,142 A 8/1992 Ramsey
5,238,164 A 8/1993 Freeman
5,282,350 A 2/1994 Crowley
5,464,142 A 11/1995 Mol et al.
5,486,390 A 1/1996 Burns et al.
5,540,369 A 7/1996 Boreali et al.
5,549,233 A 8/1996 Clauser
5,588,280 A 12/1996 Kotsiopoulos

* cited by examiner

FIG. 1
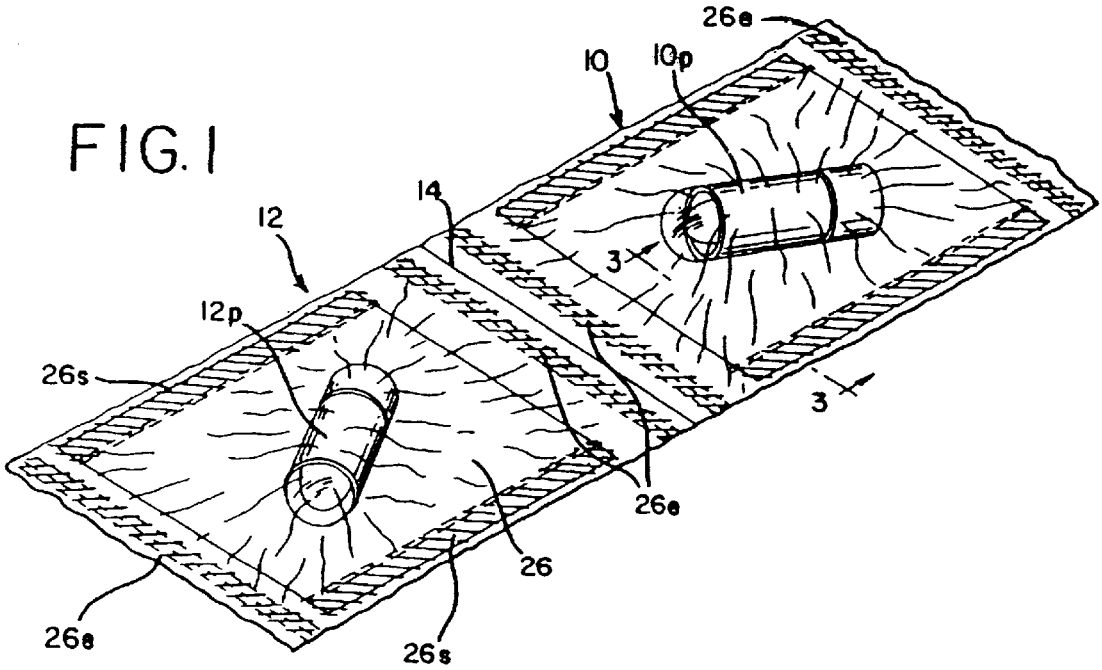
FIG. 2
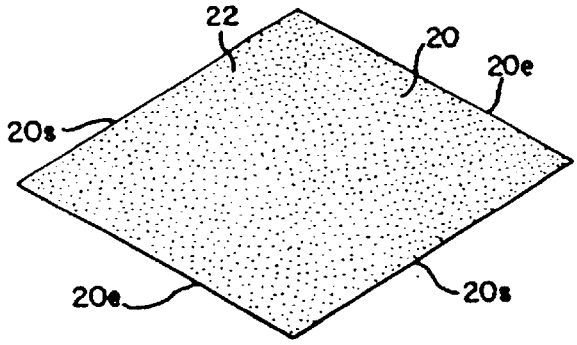
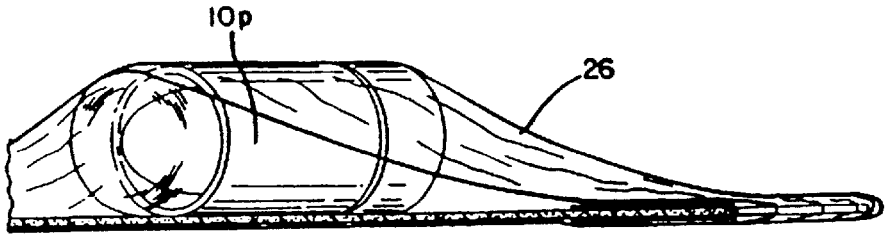
FIG. 3

THREE DIMENSIONAL INSERT CONSTRUCTION

Matter enclosed in heavy brackets [ ] appears in the original patent but forms no part of this reissue specification; matter printed in italics indicates the additions made by reissue.

This application is a continuation-*in-part* of [co-pending] application Ser. No. 8/742,785, filed Oct. 31, 1996, *abandoned*.

FIELD OF THE INVENTION

The present invention generally relates to the packaging art, and more particularly, to a three-dimensional insert construction provided in a continuous web of inserts that may readily be handled by automated packaging equipment or the like.

BACKGROUND OF THE INVENTION

Packaging apparatus particularly adapted for handling inserts or coupons provided in the continuous web are known in the art from, for example, Kotsiopoulos' U.S. Pat. No. 5,079,901, assigned to the assignee of the present invention. This document describes an apparatus and system that receives a continuous web of coupons, provides a forwardmost coupon between pairs of feed rolls and burst rolls, and at a desired time, separates the forwardmost coupon from the continuous web by applying a bursting tension to a transverse perforation separating the forwardmost coupon from the next succeeding coupon. The separated coupon is then passed to a point of insertion at a desired time such as into a moving container based on signals provided by timing circuitry.

Other insertion handling apparatus are known such as that described in Clauser's U.S. Pat. No. 5,549,233. This patent describes an insert handling system that processes three-dimensional piece inserts with the use of laterally-spaced pairs of rolls. This configuration enables the three-dimensional aspect of the insert to be "passed through" the handling; apparatus intermediate to the spaced sets of rolls. However, problems may occur with these equipment types where the projected piece insert requires a flat area to be used to drive the piece either for bursting or for projection of an individual piece into a container or the like.

One attempt to overcome this problem has been to provide an insert that utilizes a piece of rigid cardstock or the like together with a three-dimensional item. The additional rigidity provided by the cardstock adds desired stiffness to the insert. However, it does not overcome the problem of the packet or prize being laterally displaced to the peripheral sides of the cardstock during storage or handling and interfering with the rollers utilized in the burst operation. This is particularly problematic when a relatively high throughput of inserts is required, requiring frequent stoppages of the processing line. Other approaches have included the use of glue applied to the cardstock to secure the object in a desired location on the cardstock and/or the object. While this approach solves the problem of lateral movement of the three-dimensional object, it dramatically increases the manufacturing cost of the insert. In addition, proper alignment of the object with the glued portion of the cardstock is often problematic. The residual glue on the object may also by undesirable to the end user.

Yet another approach is referred to as "skin pack," in which plastic film is attached to a porous paper backer material through which a vacuum is drawn to conform the film to the item to be packaged. Although this method also solves the problem of lateral movement, the porous paper backer is, inherently, not well suited for most permeability requirements of food-contact inserts.

SUMMARY OF THE INVENTION

Accordingly, it is a general object of the invention to overcome the deficiencies of the prior art.

It is a further object of the present invention to provide a three-dimensional insert which is easily fabricated at acceptable cost, while enabling ready handling in a coupon-handling system.

The present invention provides these and other additional objects with a three-dimensional insert comprising a piece of cardstock or paperboard defined by first and second opposed ends. A thermosealable, olefin coating or film is applied to the top surface of the board. An overwrap material is contacted with the coating and is bonded therewith to provide a seal between the overwrap material and the laminate surface of the card. This arrangement presents relatively consistent surfaces that are readily grasped by coupon processing equipment. In this way, a prize or other three-dimensional object is retained in the overwrap without moving toward the peripheral sides utilized in handling the insert.

BRIEF DESCRIPTION OF THE DRAWINGS

FIG. 1 is an isometric view of first and second inserts provided in a continuous web of inserts according to the present invention;

FIG. 2 illustrates a piece of cardstock laminated with an adhesive material on two peripheral edges of the cardstock; and FIG. 3 is a sectional view of the insert shown in FIG. 1 taken along the lines 3—3.

DESCRIPTION OF THE PREFERRED EMBODIMENT

Generally, the present invention relates to an insert used in a packaging application. The insert is particularly suited for handling by automated processing equipment such as that disclosed in U.S. Pat. No. 5,549,233, the subject matter of which is incorporated herein by reference. Such equipment is adapted to engage the peripheral side edges of the insert while a three-dimensional object located in the central portion of the insert passes between the sets of rolls to enable handling of various types of three-dimensional objects. By way of example, the three-dimensional object may be a premium, prize or a package component that is intended to be inserted into a container such as a cereal lox, bag or pouch. Alternatively, the insert may be a packet of flavoring or seasoning that is intended to be placed into a container, while remaining physically separated from the remaining contents of the container.

FIG. 1 is an isometric view of first and second inserts or coupons 10, 12 provided in a continuous web or stream of inserts. In the preferred embodiment, each of the inserts 10, 12 includes a three-dimensional piece or object 10p, 12p while will ultimately be placed within a container or the like. By way of example, the objects 10p, 12p may be prizes or the like provided in cereal boxes, bread wrappers or other suitable containers. Alternatively, the pieces 10p, 12p may be small packages which are utilized in food packaging or other similar applications.

The inserts 10, 12 are preferably provided in a continuous web format and are separated from each other by a perforation 14 disposed to extend transversely to the web which connects inserts 10, 12 together. The remaining inserts in the web are similarly connected to each other.

FIG. 2 illustrates a relatively flat piece 20 of cardstock, paperboard or other material having a suitable rigidity to withstand processing by automated handling equipment. In this way, the cardstock piece provides structural support for the insert. The cardstock piece is defined by a pair of ends 20e, a pair of opposed sides 20s, and a top surface. FIG. 2 also shows the cardstock piece 20 having a thermosealable laminate 22 applied to the entire top surface of the cardstock. Preferably, the laminate 22 is an olefin-based polyethylene material or other material having suitable thermo-sealing characteristics.

Alternatively, a pair of laminate adhesive strips (not shown) may be applied to the peripheral edges of the cardstock piece 20, preferably proximate to the sides 20s. In this embodiment, the card 20 may be laminated with a heat sealable polyethylene material strips that extend the lengthwise dimension of the piece 20 between ends 20e. It should also be understood that the laminate adhesive may be applied to the top surface of the cardstock piece in other forms, such as in the form of spaced lands or the like.

The cardstock piece 20 with thermo-sealable laminated and object 10p are surrounded by a plastic overwrap material such as overwrap material 26. For example, the overwrap material may be utilized to circumscribe the object and cardstock 20 to provide a barrier with the outside such as an aseptically packaged insert. Preferably, the overwrap material ends 26e are heat sealed together to provide a transverse band which is then perforated or otherwise weakened proximate to the ends 20e of the cardstock. The sides 26s of the overwrap material are also preferably heat sealed or otherwise bonded to affixed to the lateral sides of the laminate surface 22 to completely enclose the three-dimensional object. One alternative method for engaging the overwrap material with the lateral sides of the laminate surface 22 is with the use of rollers or the like which provides a suitable compressive forces to the overwrap material and laminate to provide a seal therebetween. In any event, a seal is provided between the overwrap material and the thermo-sealable laminate surface of the cardstock at locations proximate to the side edges of the cardstock piece. In the preferred embodiment, the overwrap material is fabricated of the same material as the laminate, for example an olefin-based material. However, the overwrap may be fabricated of a different material so long as its bonding characteristics are such that it will be readily secured with the laminate surface 22 upon the application of heat and/or compressive forces applied to the lateral edges of the cardstock piece.

Accordingly, the three-dimensional object such as a promotional piece or packet is prevented from being laterally moved or dislodged toward the peripheral side edges of the insert and is kept away from the handling equipment. In addition, this arrangement presents relatively flat, uniform side surfaces which are the portions of the insert to be handled by the processing equipment.

As described in said U.S. Pat. No. 5,549,233, the web of inserts is presented to handling apparatus which engages the sides of the insert. In this regard, spaced pairs of feed rolls engage the side edges of the forwardmost insert in the web and pass the coupon downstream to a pre-dispense location, preferably such that the forwardmost coupon is engaged by spaced pairs of burst rolls while the perforation separating the forwardmost coupon is disposed between the pairs of feed rolls and the burst rolls. At the desired time, the burst rolls are rotated at relative angular speed greater than that of the feed rolls to apply a bursting tension to the perforation between the forwardmost coupon and the next succeeding coupon to disengage the forwardmost coupon from the remainder of the web and to position the coupon into a container or the like. In this way, three-dimensional inserts of the type described above may be readily placed into containers.

Accordingly, a three-dimensional insert meeting the aforestated objectives has been described. The insert provides improved structural integrity as well as improved handleability. While the invention has been described in terms of the best mode currently contemplated, those skilled in the art will appreciate that various modifications may be made without departing from the spirit and scope of the invention, as defined by the appended claims.

What is claimed is:

1. An insert adapted for use in conjunction with packaging apparatus comprising:

a three-dimensional object;

a piece of cardstock including a top surface defined by first and second ends and first and second side edges;

thermo-sealable laminate applied to the top surface of the piece of cardstock; and an overwrap material circumscribing the three-dimensional object and the cardstock, the overwrap material being in sealing relation with the laminate proximate to the first and second side edges to prevent lateral movement of the three-dimensional object toward the side edges of the cardstock.

2. The invention as in claim 1 wherein the laminate extends the lengthwise dimension of the cardstock.

3. The invention as in claim 2 wherein the overwrap material is heat-applied to the laminate.

4. The invention as in claim 1 wherein the overwrap material is heat-sealed proximate the ends of the cardstock to provide a relatively flat transverse band surface.

5. The invention as in claim 4 wherein the relatively flat transverse band surface interconnects the insert with a second insert provided in a continuous web, the transverse band including a perforation formed therein.

6. The invention as in claim 1 wherein the laminate is fabricated of an olefin-based thermo-sealable material.

7. The continuous web of a plurality of three-dimensional inserts adapted for handling by automated packaging apparatus, each insert in the web comprising:

a three-dimensional object;

a piece of cardstock including a top surface, first and second ends, and first and second side edges;

a laminate applied to the top surface of the cardstock; and an overwrap material in surrounding relation to the three-dimensional object and to the cardstock, the overwrap material being in heat-sealing engagement with the laminate proximate to the first and second side edges to present opposed, relatively flat side surface engageable with the packaging apparatus.

8. The invention as in claim 7 wherein the laminate is a thermo-sealable olefin-based material.

9. The invention as in claim 8 wherein the overwrap material is heat-sealed proximate to the ends of the cardstock to provide a relatively flat transverse band connecting one insert in the web with a succeeding insert in the web.

10. The invention as in claim 9 wherein the transverse band has a weakened portion formed therein.

11. The invention as in claim 10 wherein the weakened portion is a perforation.

*12. An insert comprising:*

*a three-dimensional object;*

*a support piece having a top surface, first and second ends, and first and second side edges; and*

*a flexible overwrap material surrounding and enclosing the three-dimensional object and the support piece, the overwrap material being sealed to the top surface of the support piece proximate to the first and second side edges; and*

*a sealable coating applied to at least a portion of the top surface of the support piece.*

*13. The insert as in claim 12 wherein the coating is applied to at least the portion of the top surface proximate the first and second side edges.*

*14. The insert as in claim 13 wherein the coating is applied only proximate the side edges.*

*15. The insert as in claim 14 wherein the coating extends the lengthwise dimension of the support piece.*

*16. The insert as in claim 12 wherein the coating is applied to only the periphery of the top surface of the support piece.*

*17. The insert as in claim 12 wherein the coating is applied to substantially all of the top surface of the support piece.*

*18. The insert as in claim 12 wherein the coating comprises an olefin-based thermosealable material.*

*19. The insert as in claim 12 wherein the support piece is chosen from the group consisting of cardboard and cardstock.*

*20. The insert as in claim 12 wherein the flexible overwrap material is heat-sealed to the support piece via the coating.*

*21. The insert as in claim 12 wherein the flexible overwrap material is sealed to itself so as to provide a relatively-flat, transverse band surface defining one end of the insert.*

*22. The insert as in any one of claims 12–21 wherein the flexible overwrap material is sealed to itself so as to provide two relatively-flat, transverse band surfaces defining each of the ends of the insert.*

*23. The insert as in claim 22 wherein one of the relatively-flat, transverse band surfaces interconnects the insert with a second such insert by one of its relatively-flat, transverse band surfaces to form a connection band.*

*24. A plurality of inserts as in claim 23 interconnected as a continuous web.*

*25. The insert as in claim 23 wherein the connection band includes a weakened portion formed therein.*

*26. A plurality of inserts as in claim 25 interconnected as a continuous web.*

*27. The insert as in claim 25 wherein the weakened portion includes a perforation.*

*28. A plurality of inserts as in claim 27 interconnected as a continuous web.*

*29. A continuous web of a plurality of inserts, each insert in the web comprising:*

*a three-dimensional object;*

*a support piece having a top surface, first and second ends, and first and second side edges; and*

*a flexible overwrap material surrounding and enclosing the three-dimensional object and the support piece, the overwrap material being sealed to the top surface of the support piece proximate to the first and second side edges; and*

*a sealable coating applied to at least a portion of the top surface of the support piece.*

*30. The continuous web as in claim 29 wherein the coating is applied to at least the portion of the top surface proximate the first and second side edges.*

*31. The continuous web as in claim 30 wherein the coating is applied only proximate the side edges.*

*32. The continuous web as in claim 31 wherein the coating extends the lengthwise dimension of the support piece.*

*33. The continuous web as in claim 29 wherein the coating is applied only to the periphery of the top surface of the support piece.*

*34. The continuous web as in claim 29 wherein the coating is applied to substantially all of the top surface.*

*35. The continuous web as in claim 29 wherein the coating comprises an olefin-based thermo-sealable material.*

*36. The continuous web as in claim 29 wherein the support piece is chosen from the group consisting of cardboard and cardstock.*

*37. The continuous web as in claim 29 wherein the flexible overwrap is heat-sealed to the support piece via the coating.*

*38. The continuous web as in any one of claims 29–37 wherein the flexible overwrap material is sealed to itself so as to provide two relatively-flat, transverse band surfaces defining each of the ends of each of the inserts.*

*39. The continuous web as in claim 38 wherein one of the relatively-flat, transverse band surfaces interconnects the insert with a second such insert by one of its relatively-flat transverse band surfaces to form a connection band.*

*40. The continuous web as in claim 39 wherein the connection band includes a weakened portion formed therein.*

*41. The continuous web as in claim 40 wherein the weakened portion includes a perforation.*

*42. An insert adapted for use in conjunction with packaging apparatus comprising:*

*a three-dimensional object;*

*a substrate having a top surface, first and second ends, and first and second side edges; and*

*an overwrap material circumscribing the three-dimensional object and the substrate, the overwrap material being in sealing relation with the top surface of the substrate proximate to the first and second side edges to inhibit lateral movement of the three-dimensional object toward the side edges of the substrate; and*

*wherein a sealable coating is applied to at least a portion of the top surface of the substrate.*

*43. The insert as in claim 42 wherein the coating extends the lengthwise dimension of the substrate.*

*44. The insert as in claim 42 or 43 wherein the overwrap material is heat-sealed to the substrate.*

*45. The insert as in claim 42 or 43 wherein the overwrap material is heat-sealed proximate the ends of the substrate to provide a relatively flat transverse band surface.*

*46. The insert as in claim 45 wherein said relatively-flat, transverse band surface interconnects the insert with a second insert.*

*47. The insert as in claim 46 wherein the transverse band includes a weakened portion formed therein.*

*48. The insert as in claim 47 wherein the weakened portion includes a perforation.*

*49. The insert as in claim 42 wherein the coating comprises an olefin-based thermo-sealable material.*

*50. The insert as in claim 42 wherein the coating is applied to only the periphery of the substrate.*

*51. The insert as in claim 42 wherein the coating is applied only proximate the side edges.*

*52. The insert as in claim 42 wherein the coating is applied to substantially all of the top surface.*

*53. A continuous web of a plurality of three-dimensional inserts, each insert in the web comprising:*

*a three-dimensional object;*

*a substrate including a top surface, first and second ends, and first and second side edges; and*

*an overwrap material in surrounding relation to the three-dimensional object and to the substrate, the overwrap material being in engagement with the top surface of the substrate proximate to the first and second side edges; and*

*wherein the substrate has a coating applied to at least a portion of its top surface.*

*54. The continuous web as in claim 53 wherein the coating is applied to only the periphery of the substrate.*

*55. The continuous web as in claim 53 wherein the coating is applied only proximate the side edges.*

*56. The continuous web as in claim 53 wherein the coating is applied to substantially all of the top surface.*

*57. The continuous web as in claim 53 wherein the coating comprises a thermo-sealable olefin-based material.*

*58. The continuous web as in one of claims 53–57 wherein the overwrap material is heat-sealed proximate to the ends of the substrate to provide a relatively flat transverse band connecting one insert in the web with a succeeding insert in the web.*

*59. The continuous web as in claim 58 wherein the transverse band has a weakened portion formed therein.*

*60. The continuous web as in claim 59 wherein the weakened portion includes a perforation.*

* * * * *